(12) United States Patent
Kobayashi

(10) Patent No.: US 8,498,096 B2
(45) Date of Patent: Jul. 30, 2013

(54) ELECTRONIC COMPONENT

(75) Inventor: Yoshitomo Kobayashi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 79 days.

(21) Appl. No.: 13/100,347

(22) Filed: May 4, 2011

(65) Prior Publication Data

US 2011/0273815 A1    Nov. 10, 2011

(30) Foreign Application Priority Data

May 10, 2010 (JP) ................................ 2010-107970

(51) Int. Cl.
*H01G 4/228* (2006.01)

(52) U.S. Cl.
USPC ..................... 361/306.3; 361/321.1; 361/303; 361/301.4; 361/321.2; 361/311

(58) Field of Classification Search
USPC ............. 361/306.3, 303, 321.1, 301.4, 321.2, 361/311
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,277,270 B2 * | 10/2007 | Sato et al. | 361/321.1 |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2007/0096254 A1 | 5/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

| | | |
|---|---|---|
| JP | 11-026291 A | 1/1999 |
| JP | 2003-229324 A | 8/2003 |
| JP | 2007-129224 A | 5/2007 |

OTHER PUBLICATIONS

Nagamiya et al., "Capacitor Array and Method for Manufacturing the Same", U.S. Appl. No. 12/249,032, filed Oct. 10, 2008.

* cited by examiner

*Primary Examiner* — Nguyen T Ha
*Assistant Examiner* — Hung Dang
(74) *Attorney, Agent, or Firm* — Keating & Bennett, LLP

(57) ABSTRACT

In an electronic component, a first capacitor conductor includes a first exposed portion exposed between insulating layers at a surface of a laminate including a first shorter side and two longer sides. A second capacitor conductor includes a second exposed portion exposed between the insulating layers at a surface of the laminate including a second shorter side and the two longer sides. First and second external electrodes are arranged on the laminate so as to cover the first and the second exposed portions, respectively. A first width of the first capacitor conductor in a region located between the second shorter side and a first straight line obtained by connecting two edges of the second external electrode is greater than a width of the first capacitor conductor in a region located between the first straight line and a straight line obtained by connecting two edges of the first external electrode.

3 Claims, 7 Drawing Sheets

US 8,498,096 B2

ELECTRONIC COMPONENT

BACKGROUND OF THE INVENTION

1. Field of the Invention

The present invention relates to an electronic component, and more particularly, to an electronic component including a laminate in which insulating layers are laminated on each other.

2. Description of the Related Art

As a related electronic component, for example, a multilayer ceramic capacitor disclosed in Japanese Unexamined Patent Application Publication No. 2007-129224 is known. The multilayer ceramic capacitor described above includes a plurality of dielectric layers, a plurality of electrodes, and terminals. The dielectric layers and the electrodes are alternately laminated to each other. The terminals are external electrodes provided on a bottom surface of a laminate including the dielectric layers. In the multilayer ceramic capacitor described above, the electrodes are exposed between the dielectric layers at the bottom surface of the laminate, and the terminals are formed by plating portions at which the electrodes are exposed.

Incidentally, in the multilayer ceramic capacitor disclosed in Japanese Unexamined Patent Application Publication No. 2007-129224, the dielectric layer may be denatured in some cases by absorbing moisture in the air (hereinafter, referred to as "moisture absorption"). As a result, the insulating properties of the dielectric layer provided between the electrodes are degraded, and a short circuit may occur therebetween.

In order to prevent a short circuit between the electrodes caused by moisture absorption, for example, the distance between the surface of the laminate and an outer periphery of the electrode may be increased. However, since the area of the electrode is decreased when the distance between the surface of the laminate and the outer periphery of the electrode is increased, the capacity of the multilayer ceramic capacitor is decreased.

SUMMARY OF THE INVENTION

To overcome the problems described above, preferred embodiments of the present invention provide an electronic component which maintains a high capacity of a capacitor while preventing degradation of performance caused by moisture absorption.

According to a preferred embodiment of the present invention, an electronic component preferably includes a laminate including a plurality of substantially rectangular insulating layers laminated on each other, each of which includes a first side and a second side extending in a first direction and a third side and a fourth side extending in a second direction, a first capacitor conductor provided on each of the insulating layers and including a first exposed portion exposed between the insulating layers at a surface of the laminate including the first side, the third side, and the fourth side, a second capacitor conductor provided on each of the insulating layers and including a second exposed portion exposed between the insulating layers at a surface of the laminate including the second side, the third side, and the fourth side, and a first external electrode and a second external electrode arranged on the laminate so as to cover the first exposed portion and the second exposed portion, respectively. In the electronic component described above, when the laminate is plan viewed in a lamination direction, the maximum value of a width in the first direction of the first capacitor conductor in a second region located between the second side and a second straight line obtained by connecting edges of the second external electrode on the third side and the fourth side located closest to the first side is preferably greater than the maximum value of a width in the first direction of the first capacitor conductor in a third region which is located between the second straight line and a first straight line obtained by connecting edges of the first external electrode on the third side and the fourth side located closest to the second side.

According to various preferred embodiments of the present invention, the capacity of the capacitor can be maintained at a high value while the degradation of performance caused by moisture absorption is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an electronic component according to preferred embodiments of the present invention will be described with reference to the drawings.

Figure 1:
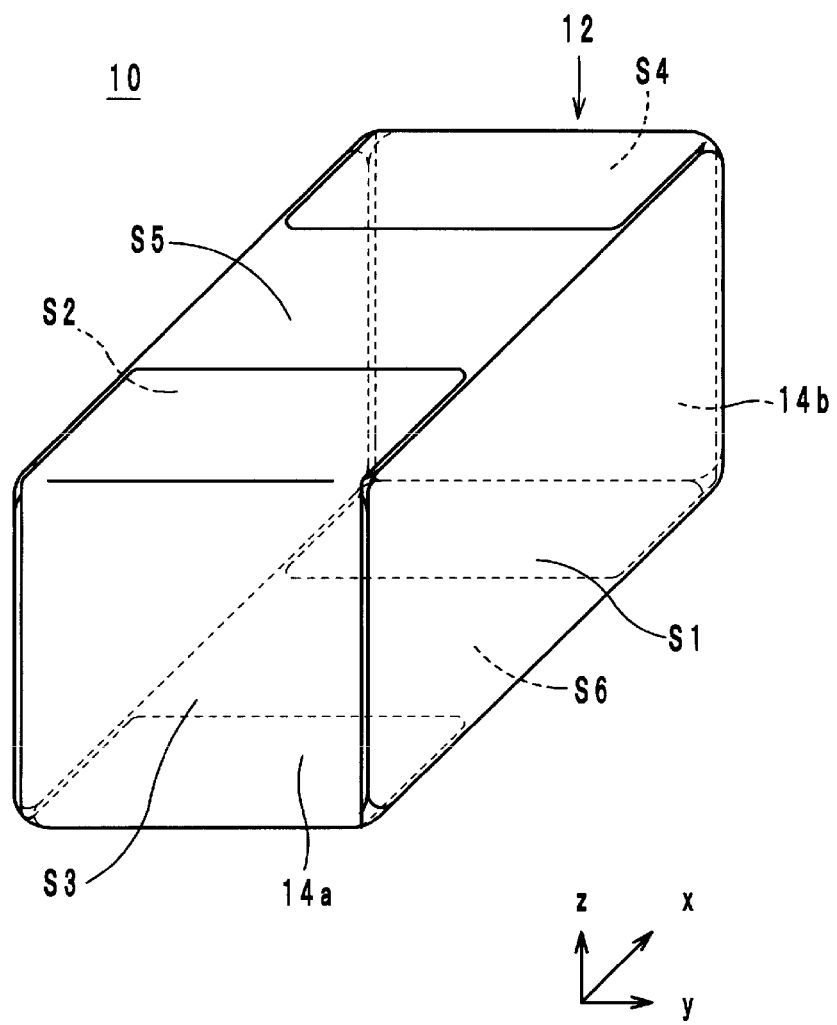
FIG. 1 is an appearance perspective view of an electronic component according to a preferred embodiment of the present invention.
Figure 2:
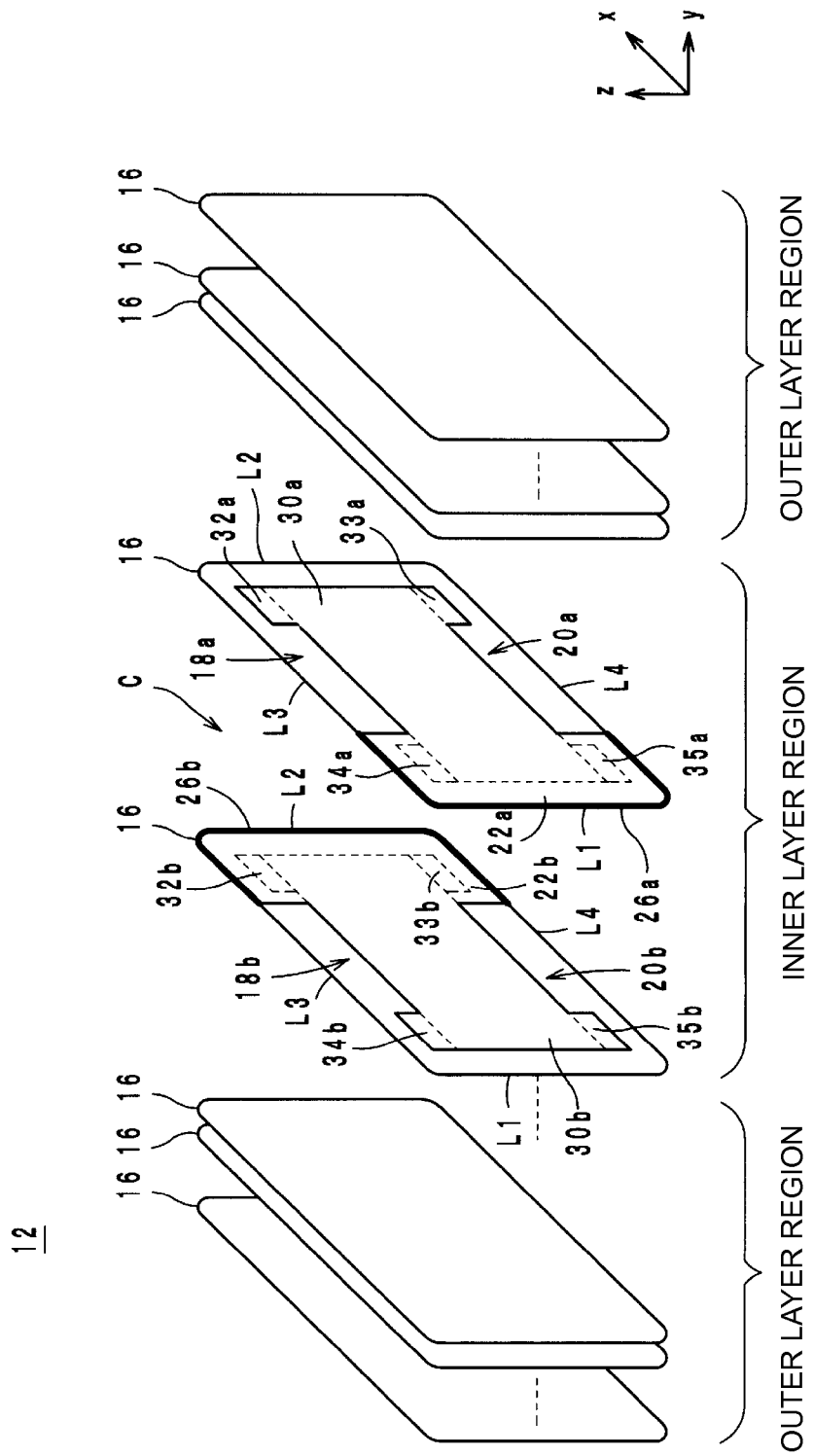
FIG. 2 is an exploded perspective view of a laminate of the electronic component.

First, the structure of the electronic component will be described with reference to the drawings. FIG. 1 is an appearance perspective view of an electronic component 10 according to a preferred embodiment of the present invention. FIG. 2 is an exploded perspective view of a laminate 12 of the electronic component 10. In this preferred embodiment, a lamination direction of the laminate 12 is defined as a y axis direction. When the laminate 12 is viewed in plan in the y axis direction, a longer side direction of the laminate 12 is defined as an x axis direction. When the laminate 12 is viewed in plan in the y axis direction, a shorter side direction of the laminate 12 is defined as a z axis direction.

As shown in FIGS. 1 and 2, the electronic component 10 is preferably a chip capacitor which includes the laminate 12, external electrodes 14 (14a and 14b), and a capacitor C (not shown in FIG. 1). The laminate 12 preferably has a substantially rectangular parallelepiped shape, for example. However, since chamfering is preferably performed, the laminate 12 has substantially round-shaped corners and ridge lines. The surface of the laminate 12 includes side surfaces S1 and S2, end surfaces S3 and S4, an upper surface S5, and a lower surface S6. Hereinafter, in the laminate 12, a surface at a positive direction side in the y axis direction is called a side surface S1, and a surface at a negative direction side in the y axis direction is called a side surface S2. In addition, a surface at a negative direction side in the x axis direction is called an end surface S3, and a surface at a positive direction side in the x axis direction is called an end surface S4. Furthermore, a surface at a positive direction side in the z axis direction is called an upper surface S5, and a surface at a negative direction side in the z axis direction is called a lower surface S6.

As shown in FIG. 2, the laminate 12 is formed by laminating a plurality of insulating layers 16. Preferably, the insulating layers 16 are each made of a dielectric ceramic and have a substantially rectangular shape in which shorter sides L1 and L2 extend in the z axis direction and longer sides L3 and L4 extend in the x axis direction. The shorter side L2 is located at the positive direction side in the x axis direction as compared to the shorter side L1, and the longer side L3 is located at the positive direction side in the z axis direction as compared to the longer side L4. As an example of the dielectric ceramic, for example, $BaTiO_3$, $CaTiO_3$, $SrTiO_3$, or $CaZrO_3$ may preferably be used. In addition, at least one of $BaTiO_3$, $CaTiO_3$, $SrTiO_3$, or $CaZrO_3$ may be used as a primary component, and for example, at least one of a Mn compound, a Mg compound, a Si compound, a Co compound, a Ni compound, and a rare earth compound may preferably be used as an accessory component. The thickness of the insulating layer 16 is preferably about 0.2 μm to about 10 μm, for example. Hereinafter, a primary surface of the insulating layer 16 at the positive direction side in the y axis direction is called a front surface, and a primary surface of the insulating layer 16 at the negative direction side in the y axis direction is called a rear surface.

As described above, the side surface S1 of the laminate is defined by the front surface of an insulating layer 16 provided at the most positive direction side in the y axis direction. The side surface S2 of the laminate 12 is defined by the rear surface of an insulating layer 16 provided at the most negative direction side in the y axis direction. In addition, the end surface S3 is defined by the shorter sides L1 of the insulating layers 16. The end surface S4 is defined by the shorter sides L2 of the insulating layers 16. The upper surface S5 is defined by the longer sides L3 of the insulating layers 16. The lower surface S6 is defined by the longer sides L4 of the insulating layers 16.

As shown in FIG. 2, the capacitor C is defined by capacitor conductors 18 (18a and 18b) embedded in the laminate 12. Preferably, the capacitor conductors 18 is made, for example, of a conductive material, such as Ni, Cu, Ag, Pd, a Ag—Pd alloy, or Au, and have a thickness of about 0.3 μm to about 2.0 μm, for example.

The capacitor conductor 18a is provided on the surface of one insulating layer 16 and preferably includes a capacity portion 20a and a lead portion 22a. The capacity portion 20a preferably has a substantially H shape and includes a body section 30a and branch sections 32a, 33a, 34a, and 35a. In addition, the capacity portion 20a is not in contact with an outer periphery of the insulating layer 16. The body section 30a is preferably a substantially rectangular conductor including a longer side in the x axis direction. The branch section 32a is preferably a conductor protruding from an end of the body section 30a at the positive direction side in the x axis direction toward the positive direction side in the z axis direction. The branch section 33a is preferably a conductor protruding from the end of the body section 30a at the positive direction side in the x axis direction toward the negative direction side in the z axis direction. The branch section 34a is preferably a conductor protruding from an end of the body section 30a at the negative direction side in the x axis direction toward the positive direction side in the z axis direction. The branch section 35a is preferably a conductor protruding from the end of the body section 30a at the negative direction side in the x axis direction toward the negative direction side in the z axis direction.

The lead portion 22a is connected to the capacity portion 20a and extends to the shorter side L1 and the longer sides L3 and L4 of the insulating layer 16. More particularly, the lead portion 22a extends to the entire shorter side L1 of the insulating layer 16 and portions of the longer side L3 and L4 thereof. Thus, at the end surface S3, the upper surface S5, and the lower surface S6 of the laminate 12 defined by the shorter side L1 and the longer sides L3 and L4 of the insulating layer 16, the lead portion 22a preferably has a substantially U-shaped exposed portion 26a exposed between adjacent two insulating layers 16.

The capacitor conductor 18b defines the capacitor C together with the capacitor conductor 18a. The capacitor conductor 18b is provided on the surface of one insulating layer 16 and includes a capacity portion 20b and a lead portion 22b. The capacity portion 20b preferably has a substantially H shape and is defined by a body section 30b and branch sections 32b, 33b, 34b, and 35b. Since the structure of the capacity portion 20b is the same or substantially the same as that of the capacity portion 20a, a description thereof will be omitted.

The lead portion 22b is connected to the capacity portion 20b and extends to the shorter side L2 and the longer sides L3 and L4 of the insulating layer 16. More particularly, the lead portion 22b extends to the entire shorter side L2 of the insulating layer 16 and portions of the longer side L3 and L4 thereof. Thus, at the end surface S4, the upper surface S5, and the lower surface S6 of the laminate 12 defined by the shorter side L2 and the longer sides L3 and L4 of the insulating layer 16, the lead portion 22b preferably has a substantially U-shaped exposed portion 26b exposed between adjacent two insulating layers 16.

The capacitor conductors 18a and 18b are provided on the insulating layers 16 so as to be alternately disposed in the y axis direction. Accordingly, the capacitor C is provided at a portion (that is, the capacity portions 20a and 20b) at which the capacitor conductor 18a faces the capacitor conductor 18b with the insulating layer 16 interposed therebetween. In addition, a region in which the insulating layers 16 provided with the capacitor conductors 18 are laminated is denoted as an inner layer region. In addition, at a positive direction side of the inner layer region in the y axis direction, insulating layers 16 each provided with no capacitor conductor 18 are preferably laminated. In addition, at a negative direction side of the inner layer region in the y axis direction, insulating layers 16 each provided with no capacitor conductor 18 are preferably laminated. Hereinafter, these two regions in which the insulating layers 16 each provided with no capacitor conductor 18 are laminated are each denoted as an outer layer region.

The external electrode 14a is preferably formed by direct plating on the end surface S3, the upper surface S5, and the lower surface S6 of the laminate 12, for example, so as to cover the exposed portion 26a. More particularly, the external electrode 14a preferably covers substantially the entire end surface S3. Furthermore, the external electrode 14a is folded from the end surface S3 to the upper surface S5 and the lower surface S6. In addition, the external electrode 14b is preferably formed by direct plating on the end surface S4, the upper surface S5, and the lower surface S6 of the laminate 12 so as to cover the exposed portion 26b. More particularly, the external electrode 14b preferably covers substantially the entire end surface S4. Furthermore, the external electrode 14b is folded from the end surface S4 to the upper surface S5 and the lower surface S6. Since the external electrodes 14 are provided as described above, the capacitor C is connected between the external electrodes 14a and 14b. As a material for the external electrodes 14, for example, Cu may preferably be used.

Figure 3A:
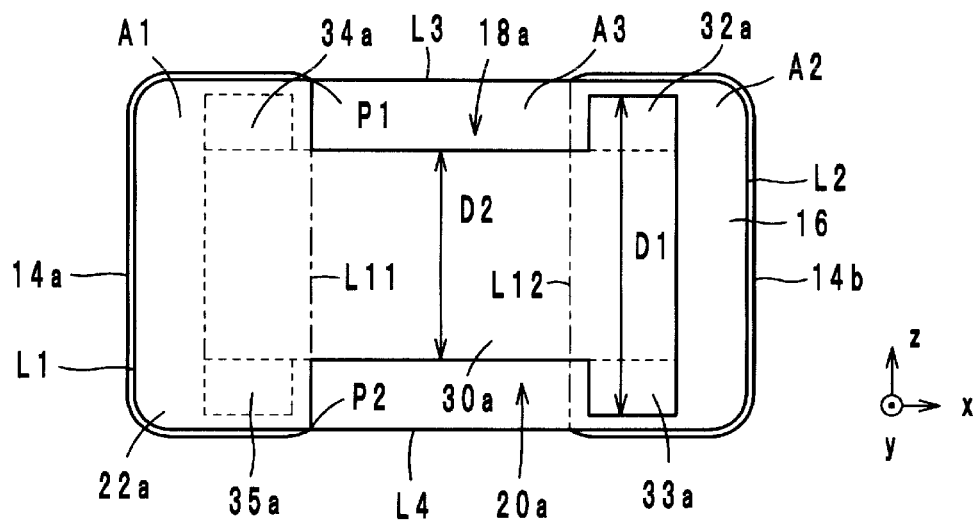
FIGS. 3A and 3B are plan views of an insulating layer provided with a capacitor conductor in the electronic component shown in FIG. 1.
Figure 3B:
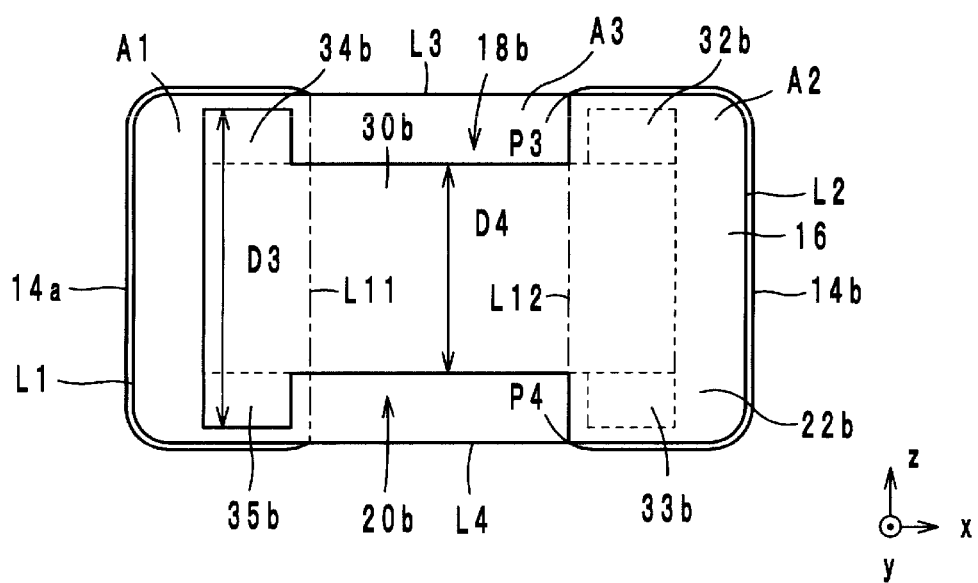

In the electronic component 10, since the branch sections 32a, 33a, 34b, and 35b are provided, the following structure is provided. FIG. 3A is a plan view of the insulating layer 16 provided with the capacitor conductor 18a, and FIG. 3B is a plan view of the insulating layer 16 provided with the capacitor conductor 18b.

As shown in FIG. 3A, when the laminate 12 is viewed in plan in the y axis direction, edges of the external electrode 14a on the longer sides L3 and L4 located closest to the shorter side L2 are defined as points P1 and P2, respectively. In addition, a straight line obtained by connecting the point P1 and the point P2 is defined as L11. In addition, as shown in FIG. 3B, when the laminate 12 is viewed in plan in the y axis direction, edges of the external electrode 14b on the longer sides L3 and L4 located closest to the shorter side L1 are defined as points P3 and P4, respectively. In addition, a straight line obtained by connecting the point P3 and the point P4 is defined as L12.

Furthermore, a region located between the shorter side L1 and the straight line L11 (that is, a region surrounded by the shorter side L1, the longer sides L3 and L4, and the straight line L11) is defined as a region A1. The region A1 is surrounded by the external electrode 14a. In addition, a region located between the shorter side L2 and the straight line L12 (that is, a region surrounded by the shorter side L2, the longer sides L3 and L4, and the straight line L12) is defined as a region A2. The region A2 is surrounded by the external electrode 14b. In addition, a region located between the straight line L11 and the straight line L12 (that is, a region surrounded by the longer sides L3 and L4 and the straight lines L11 and L12) is defined as a region A3. The region A3 is not surrounded by the external electrode 14a or 14b.

As shown in FIG. 3A, the capacitor conductor 18a preferably includes an H type capacity portion 20a. In the region A2, the capacity portion 20a includes the branch sections 32a and 33a which protrude from the body section 30a toward the positive direction side and the negative direction side, respectively, in the z direction. Thus, the maximum value of a width D1 in the z axis direction of the capacitor conductor 18a in the region A2 is preferably greater than the maximum value of a width D2 in the z axis direction of the capacitor conductor 18a in the region A3. Accordingly, the capacitor conductor 18a in the region A2 is preferably located closer to the upper surface S5 and the lower surface S6 of the laminate 12 than that in the region A3.

As shown in FIG. 3B, the capacitor conductor 18b preferably includes an H type capacity portion 20b. In the region A1, the capacity portion 20b includes the branch sections 34b and 35b which protrude from the body section 30b toward the positive direction side and the negative direction side, respectively, in the z direction. Thus, the maximum value of a width D3 in the z axis direction of the capacitor conductor 18b in the region A1 is preferably greater than the maximum value of a width D4 in the z axis direction of the capacitor conductor 18b in the region A3. Accordingly, the capacitor conductor 18b in the region A1 is preferably located closer to the upper surface S5 and the lower surface S6 of the laminate 12 than that in the region A3.

Next, a method for manufacturing the electronic component 10 will be described. With reference to FIGS. 1 and 2, the manufacturing method will be described.

After $BaTiO_3$, $CaTiO_3$, $SrTiO_3$, $CaZrO_3$, or other suitable material, for example, used as a primary component and a Mn compound, a Mg compound, a Si compound, a Co compound, a Ni compound, a rare earth compound, or other suitable material, for example, used as an accessory component are weighed at a predetermined ratio and are then charged in a ball mill, wet mixing is performed. After an obtained mixture is dried and is then pulverized, an obtained powder is calcined. After a calcined powder is wet-pulverized by a ball mill, drying and pulverizing are sequentially performed, and as a result, a dielectric ceramic powder is obtained.

To this dielectric ceramic powder, an organic binder and an organic solvent are added, and mixing is then performed using a ball mill. After a ceramic slurry is formed into sheets on a carrier sheet by a doctor blade method, drying is performed so as to form ceramic green sheets which are to be formed into the insulating layers 16. The thickness of the ceramic green sheet which is to be formed into the insulating layer 16 is preferably about 0.5 μm to about 10 μm, for example.

Next, the capacitor conductors 18a and 18b are formed on the ceramic green sheets which are to be formed into the insulating layers 16 by applying a paste including a conductive material using a method, such as a screen printing or a photolithographic method, for example. As the paste including a conductive material, for example, a paste formed by adding an organic binder and an organic solvent to a metal powder may preferably be used, for example.

Next, the ceramic green sheets which are to be formed into the insulating layers 16 are sequentially laminated, so that a green mother laminate is obtained. In a step of sequentially pressure-bonding the ceramic green sheets, a pressure of about 10 kN to about 500 kN was applied thereto. Subsequently, pressure bonding is performed on the green mother laminate by a hydrostatic pressure press.

Next, the green mother laminate is cut into a plurality of green laminates 12 each having a desired size. Subsequently, a barrel polishing process is preferably performed on the surfaces of the laminates 12, so that the corners and the ridge lines of the laminates 12 are chamfered.

Next, the green laminate 12 is fired. As a firing temperature, for example, a temperature of about 900° C. to about 1,300° C. is preferable.

Finally, the external electrodes 14 are formed by direct plating. Thus, the electronic component 10 is formed through the steps described above.

According to the electronic component 10 described above, the capacity of the capacitor C can be maintained at a high value while the performance is prevented from being degraded due to moisture absorption. More particularly, in the electronic component 10, the outer periphery of each of the capacitor conductors 18a and 18b is preferably spaced apart from the upper surface S5 and the lower surface S6 of the laminate 12 in order to prevent degradation of the performance caused by moisture absorption. However, in this case, since the area of each of the capacitor conductors 18a and 18b is decreased, the capacity of the capacitor C is decreased.

Accordingly, in the electronic component 10, in the regions A2 and A1 surrounded by the external electrodes 14b and 14a, respectively, the branch sections 32a and 33a and the branch sections 34b and 35b, which protrude from the body sections 30a and 30b, respectively, are provided. Since the branch sections 32a, 33a, 34b, and 35b are provided, the area of each of the capacity portions 20a and 20b is increased. Thus, the capacity of the capacitor C is increased.

The regions A1 and A2 are surrounded by the external electrodes 14a and 14b, respectively. Thus, the insulating layers 16 in the regions A1 and A2 are not likely to be denatured by absorption of moisture in the air. As a result, the generation of a short circuit between the capacitor conductors 18a and 18b is prevented which is caused by degradation in insulating properties of the insulating layer 16 provided therebetween.

In addition, in the electronic component 10, since the lead portions 22a and 22b each extend to the longer side L3 and L4, the thickness of the laminate 12 in the y axis direction is more uniform. In more particular, in the electronic component 10, when the lead portions 22a and 22b do not extend to the longer sides L3 and L4, the lead portions 22a and 22b of the capacitor conductors 18a and 18b are each arranged at a central portion of the laminate 12 in the z axis direction, and the lead portions 22a and 22b of the capacitor conductors 18a and 18b are not disposed at ends of the laminate 12 in the z axis direction. In this case, the thickness in the y axis direction of the laminate at the central portion thereof in the z axis direction is greater than that in the y axis direction of the laminate 12 at each of the two ends thereof in the z axis direction by the thicknesses of the lead portions 22a and 22b. Thus, the thickness of the laminate 12 in the y axis direction is not uniform.

On the other hand, in the electronic component 10, by extending to the longer sides L3 and L4, the lead portions 22a and 22b of the capacitor conductors 18a and 18b are provided at the central portion and the two ends of the laminate 12 in the z axis direction. Thus, the difference between the thickness in the y axis direction of the laminate 12 at each of the two ends in the z axis direction and that of the laminate 12 at the central portion in the z axis direction is decreased. As a result, in the electronic component 10, the thickness of the laminate 12 in the y axis direction is more uniform.

Hereinafter, the capacitor conductors 18a and 18b according to modified preferred embodiments of the present invention will be described. In the capacitor conductors 18a and 18b, the maximum value of the width D1 in the z axis direction of the capacitor conductor 18a in the region A2 may preferably be greater than the maximum value of the width D2 in the z axis direction of the capacitor conductor 18a in the region A3, and the maximum value of the width D3 in the z axis direction of the capacitor conductor 18b in the region A1 may preferably be greater than the maximum value D4 in the z axis direction of the capacitor conductor 18b in the region A3. Thus, the structure of each of the capacitor conductors 18a and 18b is not limited to that shown in FIGS. 2, 3A, and 3B. Hereinafter, the capacitor conductors 18a and 18b according to the modified preferred embodiments will be described.

Figure 4A:
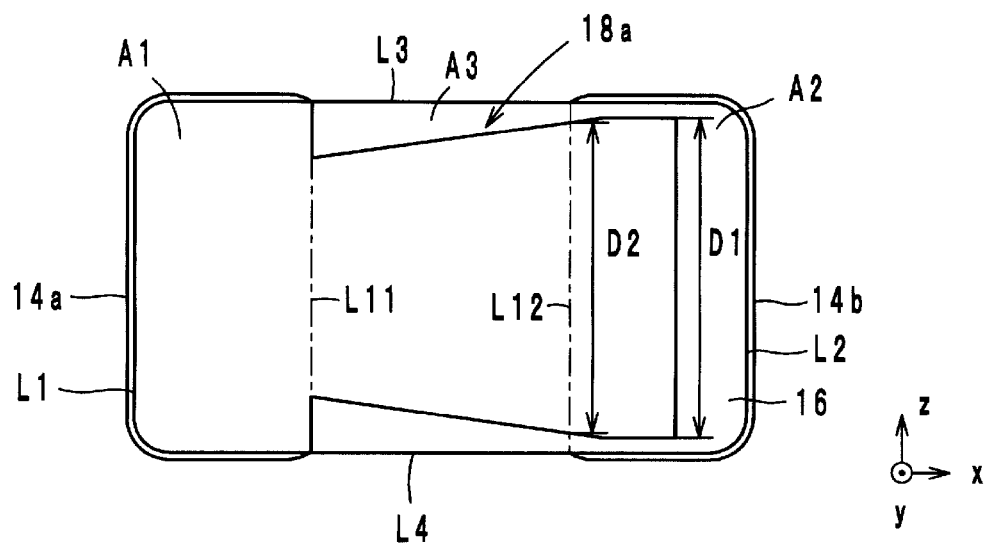
FIGS. 4A and 4B are plan views of an insulating layer provided with a capacitor conductor according to a first modified preferred embodiment of the present invention.

First, the capacitor conductors 18a and 18b according to a first modified preferred embodiment will be described with reference to FIGS. 4A and 4B. FIG. 4A is a plan view of the insulating layer 16 provided with the capacitor conductor 18a according to the first modified preferred embodiment, and FIG. 4B is a plan view of the insulating layer 16 provided with the capacitor conductor 18b according to the first modified preferred embodiment.

Figure 4B:
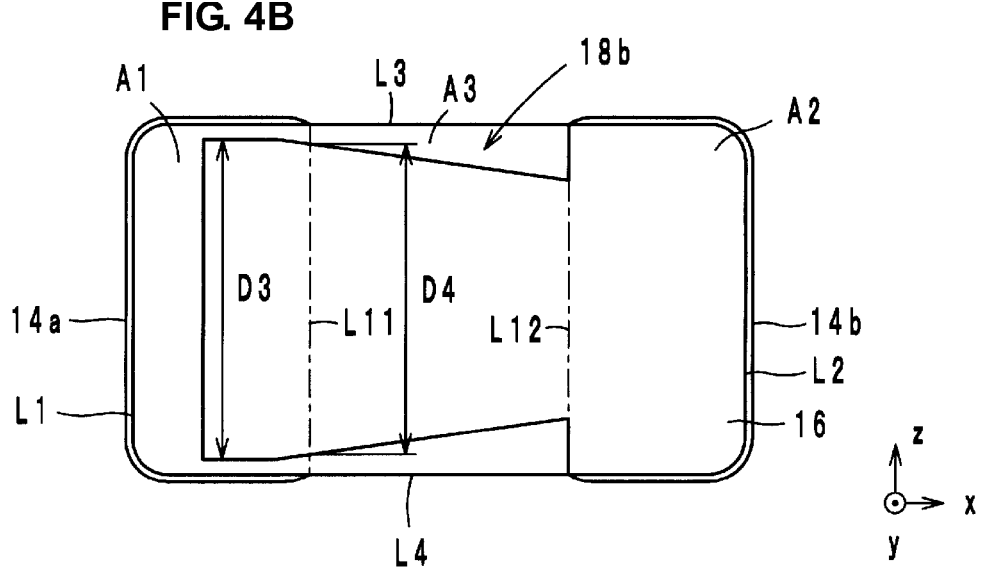

The capacitor conductors 18a and 18b shown in FIGS. 4A and 4B preferably have a substantially trapezoidal shape in the region A3 and a substantially rectangular shape in each of the regions A2 and A1. An area at which the capacitor conductor 18a shown in FIG. 4A and the capacitor conductor 18b shown in FIG. 4B face each other is preferably greater than that at which the capacitor conductors 18a and 18b shown in FIGS. 3A and 3B face each other. As a result, in the electronic component 10 including the capacitor conductors 18a and 18b according to the first modified preferred embodiment shown in FIGS. 4A and 4B, the capacity of the capacitor C is increased.

Figure 5A:
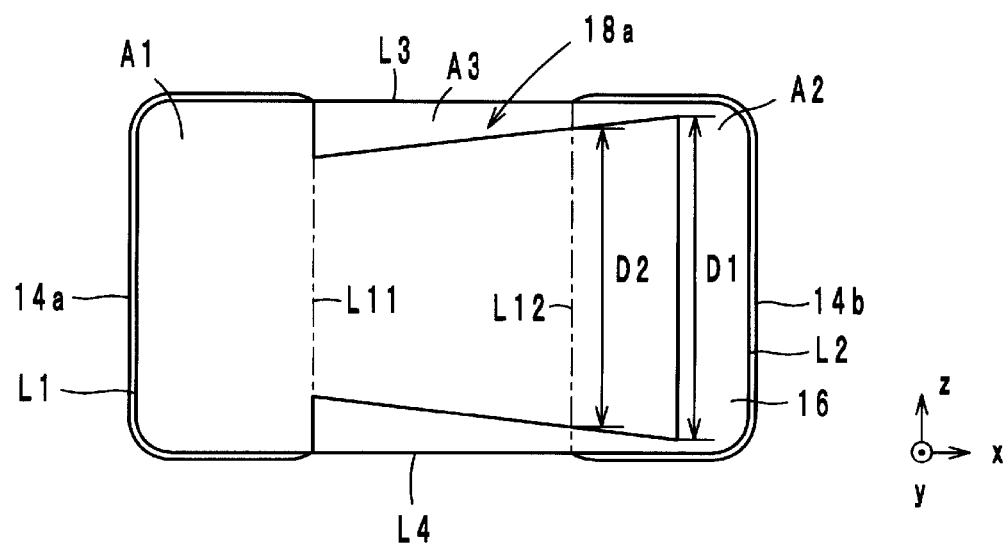
FIGS. 5A and 5B are plan views of an insulating layer provided with a capacitor conductor according to a second modified preferred embodiment of the present invention.

Next, the capacitor conductors 18a and 18b according to a second modified preferred embodiment will be described with reference to FIGS. 5A and 5B. FIG. 5A is a plan view of the insulating layer 16 provided with the capacitor conductor 18a according to the second modified preferred embodiment, and FIG. 5B is a plan view of the insulating layer 16 provided with the capacitor conductor 18b according to the second modified preferred embodiment.

Figure 5B:
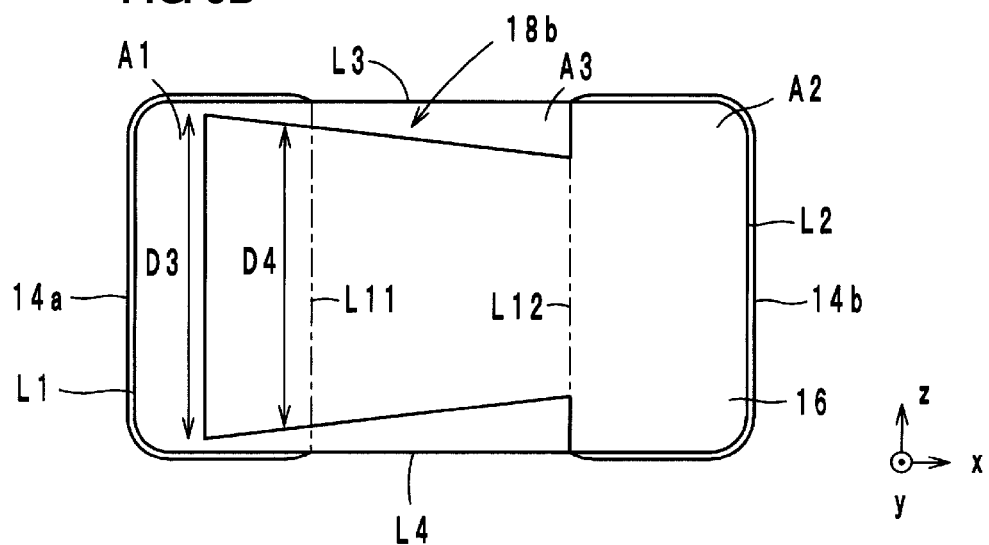

As shown in FIGS. 5A and 5B, the capacitor conductor 18a preferably has a substantially trapezoidal shape in each of the regions A2 and A3, and the capacitor conductor 18b preferably has a substantially trapezoidal shape in each of the regions A1 and A3. An area at which the capacitor conductor 18a shown in FIG. 5A and the capacitor conductor 18b shown in FIG. 5B face each other is also preferably greater than that at which the capacitor conductors 18a and 18b shown in FIGS. 3A and 3B face each other. As a result, in the electronic component 10 including the capacitor conductors 18a and 18b according to the second modified preferred embodiment shown in FIGS. 5A and 5B, the capacity of the capacitor C is increased.

Figure 6A:
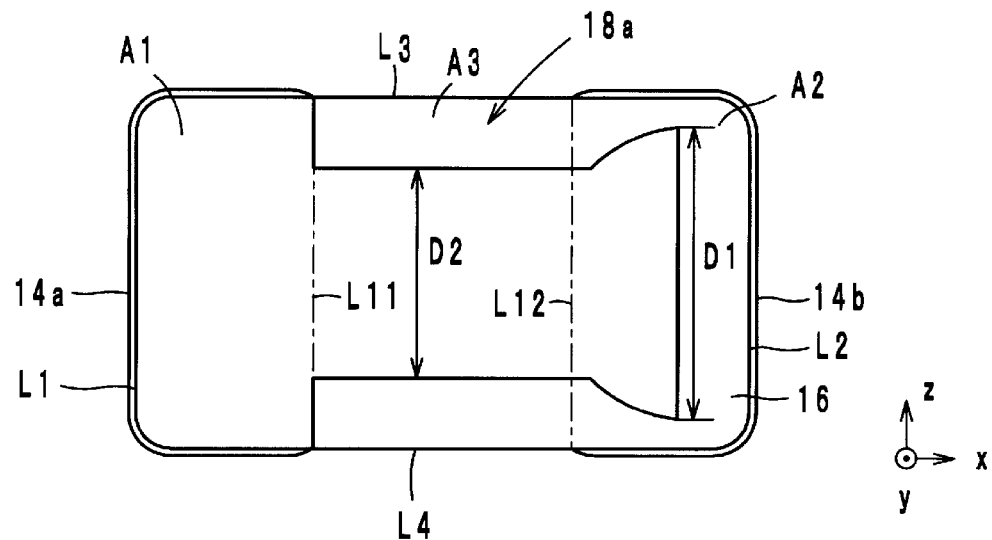
FIGS. 6A and 6B are plan views of an insulating layer provided with a capacitor conductor according to a third modified preferred embodiment of the present invention.

Next, the capacitor conductors 18a and 18b according to a third modified preferred embodiment will be described with reference to FIGS. 6A and 6B. FIG. 6A is a plan view of the insulating layer 16 provided with the capacitor conductor 18a according to the third modified preferred embodiment, and FIG. 6B is a plan view of the insulating layer 16 provided with the capacitor conductor 18b according to the third modified preferred embodiment.

Figure 6B:
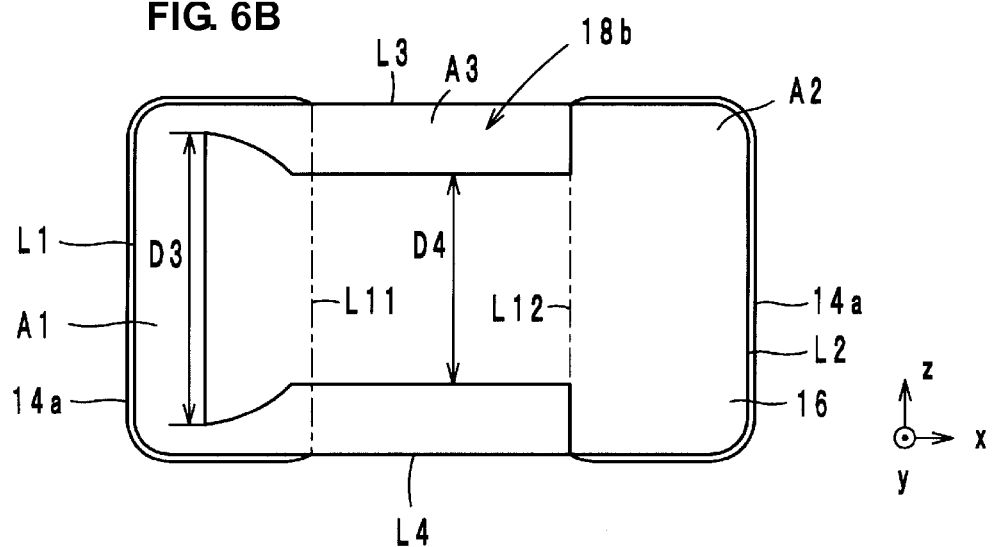

As shown in FIGS. 6A and 6B, the capacitor conductors 18a and 18b preferably have a substantially rectangular shape in the region A3 and a substantially trapezoidal shape in each of the regions A2 and A1. However, a leg portion of each of the capacitor conductors 18a and 18b in the regions A2 and A1, respectively, is not defined by a straight line and, instead, is defined by a curved line. According to the capacitor conductors 18a and 18b having the structures as described above, the maximum value of the width D1 of the capacitor conductor 18a in the z axis direction in the regions A2 is preferably greater than the maximum value of the width D2 of the capacitor conductor 18a in the z axis direction in the region A3, and the maximum value of the width D3 of the capacitor conductors 18b in the z axis direction in the region A1 is preferably greater than the maximum value of the width D4 of the capacitor conductor 18b in the z axis direction in the region A3.

In addition, although the outer periphery of each of the capacitor conductors 18a and 18b preferably has a straight line or a curved line, for example, the outer periphery may also have a wavy line or a zigzag line.

The electronic component 10 according to preferred embodiments of the present invention is not limited to those described in the above preferred embodiments and may be modified within the scope of the present invention.

Figure 7:
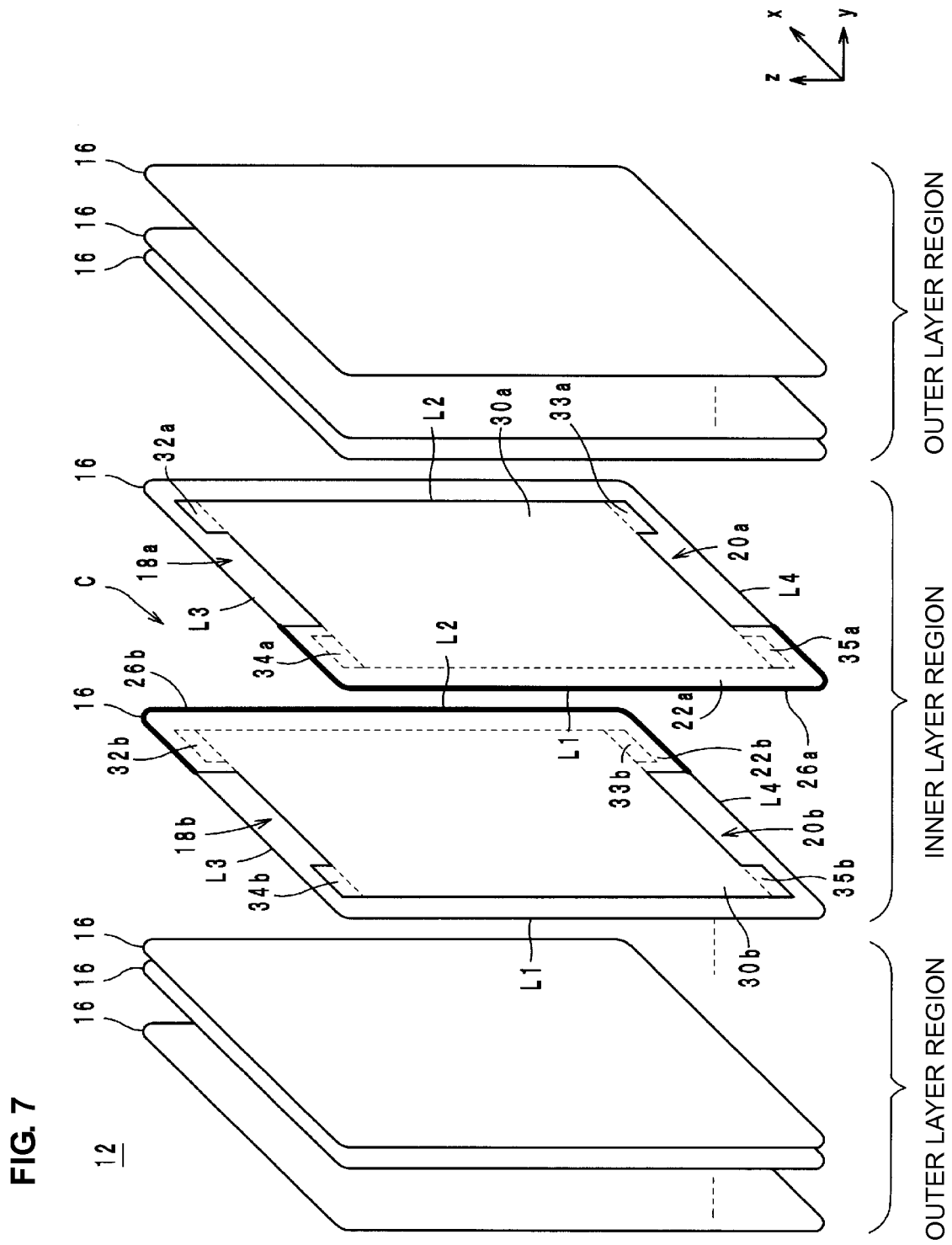
FIG. 7 is an exploded perspective view of a laminate of an electronic component according to another preferred embodiment of the present invention.

In the electronic component 10, as shown in FIGS. 1 and 2, the laminate 12 preferably includes a longer side in the x axis direction. In addition, in the laminate 12, the external electrodes 14a and 14b are provided at the two ends of the longer side in the x axis direction. However, the laminate 12 may preferably have a shorter side in the x axis direction as shown in an exploded perspective view of the laminate 12 of the electronic component 10 according to another preferred embodiment of the present invention shown in FIG. 7. In this case, in the laminate 12, the external electrodes 14a and 14b are provided at the two ends of the shorter side in the x axis direction.

Although being formed preferably by one direct plating step as described above, the external electrodes 14 may preferably be formed by two plating steps. In particular, after an underlayer plating film is formed by a first direct plating step, an upper-layer plating film is formed on the underlayer plating film by a second plating step. A material for the underlayer plating film and the upper-layer plating film is preferably a metal selected from Cu, Ni, Sn, Pb, Au, Ag, Pd, Bi, or Zn or an alloy containing at least two types of metals, for example. In addition, when Ni is used as a material for the capacitor conductor 18, Cu having good compatibility with Ni, for example, is preferably used as a material for the underlayer plating film. Furthermore, the upper-layer plating film may have a two-layer structure including a first upper-layer plating film and a second upper-layer plating film. As a material for the first upper-layer plating film in contact with the underlayer plating film, Ni, for example, which is not likely to be eroded by solder, is preferably used. In addition, as a material for the second upper-layer plating film exposed to the outside, Sn or Au, for example, which has excellent solder wettability, is preferably used. The thicknesses of the underlayer plating film, the first upper-layer plating film, and the second upper-layer plating film are each preferably about 1 μm to about 15 μm, for example.

In addition, the exterior electrodes 14a and 14b are not necessarily formed by direct plating. Instead, the external electrodes 14a and 14b may be formed by immersing (that is, dipping) the laminate 12 in a conductive paste including Ag, for example.

As has thus been described above, preferred embodiments of the present invention are preferably applied to electronic components and, in particular, are excellent in maintaining a high capacity of the capacitor while suppressing degradation of the performance caused by moisture absorption.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a laminate including a plurality of substantially rectangular insulating layers laminated to each other in a lamination direction, each of which includes a first side and a second side extending in a first direction and a third side and a fourth side extending in a second direction, the first direction and the second direction both being perpendicular to the lamination direction;
    a first capacitor conductor provided on the plurality of insulating layers and including a first exposed portion exposed between the insulating layers at a surface of the laminate including the first side, the third side, and the fourth side;
    a second capacitor conductor provided on the plurality of the insulating layers and including a second exposed portion exposed between the insulating layers at a surface of the laminate including the second side, the third side, and the fourth side; and
    a first external electrode and a second external electrode arranged on the laminate so as to cover the first exposed portion and the second exposed portion, respectively; wherein
    a maximum value of a width in the first direction of the first capacitor conductor in a second region which is defined between the second side and a second straight line obtained by connecting edges of the second external electrode on the third side and the fourth side located closest to the first side is greater than a maximum value of a width in the first direction of the first capacitor conductor in a third region which is defined between the second straight line and a first straight line obtained by connecting edges of the first external electrode on the third side and the fourth side located closest to the second side.

2. The electronic component according to claim 1, wherein a maximum value of a width in the first direction of the second capacitor conductor in a first region which is defined between the first straight line and the first side is greater than a maximum value of a width in the first direction of the second capacitor conductor in the third region.

3. The electronic component according to claim 1, wherein the first external electrode and the second external electrode are defined by directly plated layers provided on the laminate.

* * * * *